United States Patent
Li

(10) Patent No.: US 11,502,802 B2
(45) Date of Patent: Nov. 15, 2022

(54) TRANSMISSION METHOD AND DEVICE AND RECEPTION METHOD AND DEVICE FOR DOWNLINK DATA, AND STORAGE MEDIUM

(71) Applicant: ZTE Corporation, Shenzhen (CN)

(72) Inventor: Bin Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 312 days.

(21) Appl. No.: 16/627,730

(22) PCT Filed: Aug. 9, 2018

(86) PCT No.: PCT/CN2018/099714
§ 371 (c)(1),
(2) Date: Dec. 30, 2019

(87) PCT Pub. No.: WO2019/062345
PCT Pub. Date: Apr. 4, 2019

(65) Prior Publication Data
US 2020/0220690 A1 Jul. 9, 2020

(30) Foreign Application Priority Data
Sep. 27, 2017 (CN) .......................... 201710890450.6

(51) Int. Cl.
*H04L 5/00* (2006.01)
*H04B 7/06* (2006.01)
*H04W 16/26* (2009.01)
*H04W 72/04* (2009.01)
*H04W 72/08* (2009.01)
*H04W 16/28* (2009.01)
*H04W 52/14* (2009.01)
*H04W 52/34* (2009.01)

(52) U.S. Cl.
CPC ......... *H04L 5/0053* (2013.01); *H04B 7/0617* (2013.01); *H04L 5/0044* (2013.01);
(Continued)

(58) Field of Classification Search
CPC ... H04L 5/0053; H04L 5/0073; H04L 5/0044; H04L 5/0005; H04L 5/0023;
(Continued)

(56) References Cited

U.S. PATENT DOCUMENTS

2003/0119452 A1 6/2003 Kim
2007/0153834 A1 7/2007 Qu
(Continued)

FOREIGN PATENT DOCUMENTS

CN 1452326 A 10/2003
CN 101453740 A 6/2009
(Continued)

OTHER PUBLICATIONS

English translation of WO 2018/025928 A1, Nagata et al. ("Nagata"), 2018, Retrieved from PE2E Search on Mar. 23, 2022. (Year: 2018).*
(Continued)

*Primary Examiner* — Omar J Ghowrwal
(74) *Attorney, Agent, or Firm* — Cantor Colburn LLP

(57) ABSTRACT

Provided are a method and apparatus for transmitting downlink data, a method and apparatus for receiving downlink data, and a storage medium. The method for transmitting downlink data includes transmitting the downlink data by using at least one of a cell-level common channel in a downlink channel or a downlink user-level channel in the downlink channel. The cell-level common channel and the downlink user-level channel occupy different time-domain positions.

19 Claims, 6 Drawing Sheets

Transmit the downlink data by using at least one of a cell-level common channel in a downlink channel or a downlink user-level channel in the downlink channel, where the cell-level common channel and the downlink user-level channel occupy different time-domain positions — S102

(52) U.S. Cl.
CPC ......... *H04W 16/26* (2013.01); *H04W 72/042* (2013.01); *H04W 72/0453* (2013.01); *H04W 72/08* (2013.01); *H04L 5/0005* (2013.01); *H04L 5/0023* (2013.01); *H04L 5/0073* (2013.01); *H04W 16/28* (2013.01); *H04W 52/143* (2013.01); *H04W 52/346* (2013.01); *H04W 72/0446* (2013.01)

(58) Field of Classification Search
CPC .. H04B 7/0617; H04W 16/26; H04W 72/042; H04W 72/0453; H04W 72/08; H04W 16/28; H04W 52/143; H04W 52/346; H04W 72/0446
See application file for complete search history.

(56) References Cited

U.S. PATENT DOCUMENTS

2016/0037560 A1    2/2016  Liu
2016/0360538 A1*  12/2016  Jwa ..................... H04L 5/0057
2019/0158166 A1*   5/2019  Takano ................ H04W 24/10

FOREIGN PATENT DOCUMENTS

| | | |
|---|---|---|
| CN | 101562504 A | 10/2009 |
| CN | 101815047 A | 8/2010 |
| CN | 107295668 A | 10/2017 |
| CN | 107635241 A | 1/2018 |
| EP | 1119113 A2 | 7/2001 |
| EP | 3018956 A2 | 5/2016 |
| EP | 3379882 A1 | 9/2018 |
| WO | 2017114021 A1 | 7/2017 |
| WO | WO-2018025928 A1 * | 2/2018 ......... H04L 25/0204 |

OTHER PUBLICATIONS

International Search Report for corresponding application PCT/CN2018/099714 filed Aug. 9, 2018; dated Oct. 31, 2018.
Chinese Office Action for corresponding application 201710890450.6; Report dated Aug. 28, 2020.
Chinese Search Report for corresponding application 201710890450.6; Report dated Aug. 28, 2020.
European Search Report for corresponding application EP18860278; Report dated May 28, 2021.

* cited by examiner

Transmit the downlink data by using at least one of a cell-level common channel in a downlink channel or a downlink user-level channel in the downlink channel, where the cell-level common channel and the downlink user-level channel occupy different time-domain positions — S102

Receive the downlink data transmitted by a base station by using at least one of a cell-level common channel in a downlink channel or a downlink user-level channel in the downlink channel, where a time-domain position at which the downlink data transmitted by the base station by using the cell-level common channel is received is different from a time-domain position at which the downlink data transmitted by the base station by using the downlink user-level channel is received — S302

FIG. 3

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| D | GP | GP | U | U | U | U | U | D | D | D | D | D | D | D | D | D | C | D | D |

FIG. 4

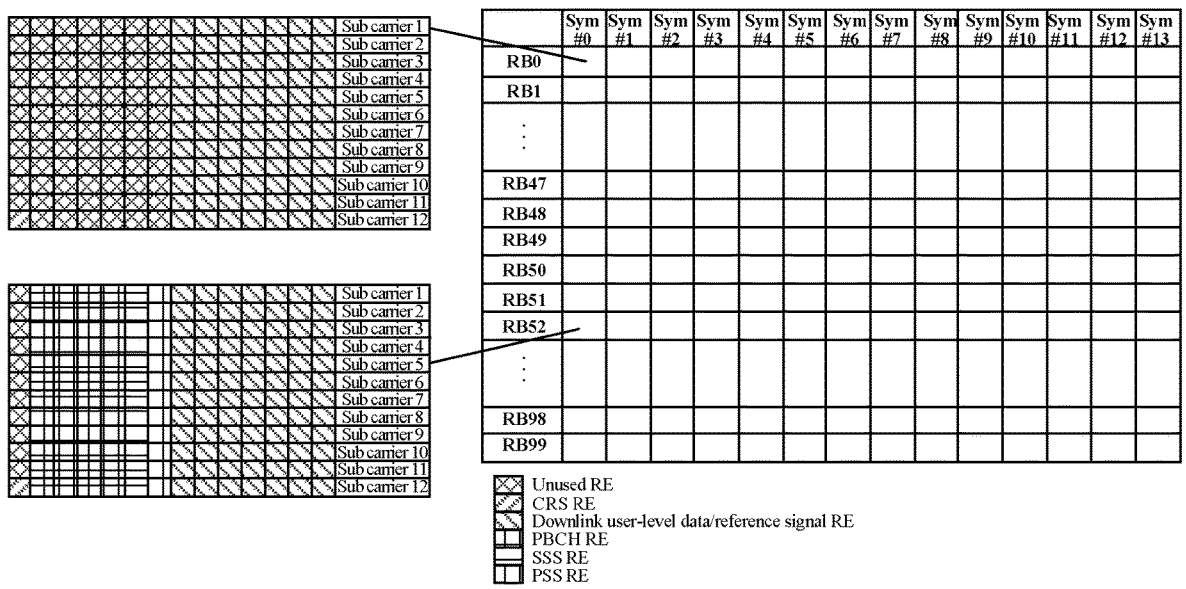

FIG. 5

|  | Subframe number ||||||||||
| --- | --- | --- | --- | --- | --- | --- | --- | --- | --- | --- |
|  | 0 | 1 | 2 | 3 | 4 | 5 | 6 | 7 | 8 | 9 |
| Downlink | D | D | D | D | C | D | D | D | D | D |
| Uplink | U | U | U | U | U | U | U | U | U | U |
FIG. 10
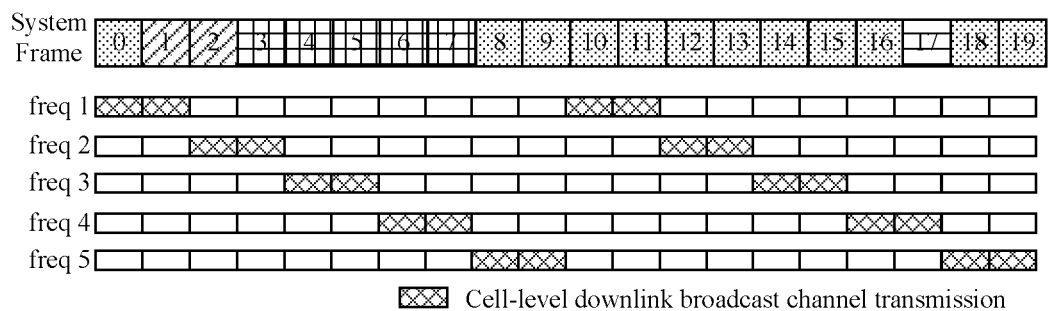
FIG. 11
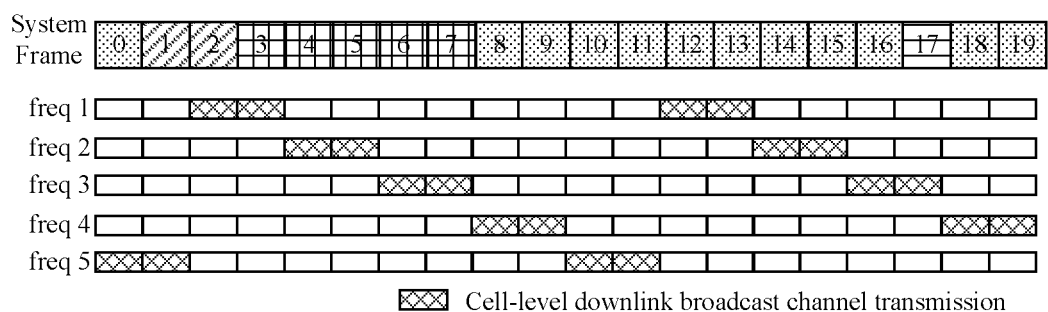
FIG. 12

TRANSMISSION METHOD AND DEVICE AND RECEPTION METHOD AND DEVICE FOR DOWNLINK DATA, AND STORAGE MEDIUM

CROSS REFERENCE TO RELATED APPLICATION

This application claims priority to Chinese patent application No. 201710890450.6 filed on Sep. 27, 2017, disclosure of which is incorporated herein by reference in its entirety.

TECHNICAL FIELD

The present disclosure relates to, but is not limited to, the field of communications and, in particular, relates to a method and apparatus for transmitting downlink data, a method and apparatus for receiving downlink data, and a storage medium.

BACKGROUND

Nowadays, with the rapid development of the wireless communication technology, spectrum resources become more and more valuable, national governments are increasingly strict in the management of the licensed use of spectrum resources, and the license fees for spectrum resources are also increasingly high. In many parts of the world, wireless spectrum resources are relatively scarce and expensive, and many small and medium-sized operators cannot obtain enough high-quality and continuous spectrum resources. This increases the difficulty in building wireless communication systems, especially some private networks (for example, wireless communication networks for the ocean, wireless communication networks for high-speed railways and ground-to-air wireless communication networks) and thus restricts the network capacity.

The Wireless Fidelity (WI-FI) system based on the IEEE802.11 family of protocols usually occupies 2.4G and 5G spectrum resources. The 2.4G band (IEEE802.11b/g/n) has a spectrum range of 2.4 GHz to 2.4835 GHz, occupies a total bandwidth of 83.5 MHz and is divided into 14 subchannels. Among the 14 subchannels, each subchannel has a width of 22 MHz, an interval of 5 MHz exists between center frequencies of neighboring channels, and multiple neighboring channels occupy overlapping frequencies. The 5G band (IEEE802.11n) has a spectrum range of 2.150 GHz to 2.850 GHz and occupies a total bandwidth of 70 MHz. IEEE802.11n is the mainstream standard of existing WI-FI devices, that is, existing WI-FI devices need to allow for both 2.4G and 5G frequency bands, each of the two frequency bands includes multiple subchannel resources, and usually only one or part of the subchannels need to be selected to meet the communication requirements of the WI-FI system.

The spectrum resources occupied by the WI-FI system are basically in the Industrial Scientific Medical (ISM) band. The ISM is defined by the ITU Radio Communication Sector (ITU-R). The ISM refers to wireless frequency bands reserved, by countries around the world, for industrial, scientific and research, and microwave medical applications. The application of these frequency bands does not require a license. These frequency bands can be used as long as certain transmitted power (generally less than 1 W) is used and other frequency bands are not interfered with. The ISM band may be configured according to the actual situation of each country, but the 2.4 GHz frequency band is the common ISM band for countries around the world.

Based on the above, it is feasible to establish, on the ISM spectrum, other wireless communication systems using the same spectrum as the WI-FI system, but the designed wireless communication systems need to comply with national laws, and the transmitted power of the designed wireless communication system needs to be lower than a fixed threshold to avoid the interference between different systems.

However, a private network represented by ground-to-air coverage and ocean coverage has a high requirement for the coverage distance of a cell. The coverage distance of a single cell is usually above 100 km so that the site construction costs can be saved. How to meet the requirement for coverage distance in the case of limited transmitted power is a difficult problem to be solved in the industry and is a major obstacle to application of the ISM band to an ultra-long-coverage wireless communication system.

SUMMARY

In embodiments of the present disclosure, a method and apparatus for transmitting downlink data, a method and apparatus for receiving downlink data, and a storage medium are provided to solve at least the problem in which the requirement for longer-distance coverage cannot be satisfied in the case of limited transmitted power in the related art.

According to one embodiment of the present disclosure, a method for transmitting downlink data is provided. The method includes transmitting the downlink data by using at least one of a cell-level common channel in a downlink channel or a downlink user-level channel in the downlink channel. The cell-level common channel and the downlink user-level channel occupy different time-domain positions.

In some embodiments, according to another aspect of the present disclosure, a method for receiving downlink data is provided. The method includes receiving the downlink data transmitted by a base station and by using at least one of a cell-level common channel in a downlink channel or a downlink user-level channel in the downlink channel. A time-domain position at which the downlink data transmitted by the base station by using the cell-level common channel is received is different from a time-domain position at which the downlink data transmitted by the base station by using the downlink user-level channel is received.

In some embodiments, according to another aspect of the present disclosure, an apparatus for transmitting downlink data is provided. The apparatus includes a transmitting module, which is configured to transmit the downlink data by using at least one of a cell-level common channel in a downlink channel or a downlink user-level channel in the downlink channel. The cell-level common channel and the downlink user-level channel occupy different time-domain positions.

In some embodiments, according to another aspect of the present disclosure, an apparatus for receiving downlink data is provided. The apparatus includes a receiving module, which is configured to receive the downlink data transmitted by a base station by using at least one of a cell-level common channel in a downlink channel or a downlink user-level channel in the downlink channel. A time-domain position at which the downlink data transmitted by the base station by using the cell-level common channel is received is different from a time-domain position at which the downlink data transmitted by the base station by using the downlink user-level channel is received.

In some embodiments, according to another aspect of the present disclosure, a storage medium including stored programs is provided. When executed, the programs cause any preceding method to be performed.

According to another aspect of the present disclosure, a communication device is provided. The communication device includes a memory; and a processor connected to the memory and configured to execute programs stored in the memory. When executed, the programs cause any preceding method to be performed.

In the solution provided in embodiments of the present disclosure, the downlink data is transmitted by using a cell-level common channel and a downlink user-level channel in a time division manner. Compared with the related art in which data is transmitted by using a cell-level common channel and a downlink user-level channel at the same time-domain position, the solution provided in the present disclosure can effectively improve the power, thereby achieving the purpose of allowing for a longer coverage distance, solving the problem in which the requirement for longer-distance coverage cannot be satisfied in the case of limited transmitted power in the related art, and achieving the effect of increasing the transmitted power of the broadcast channel and implementing longer-distance coverage by allocating power in the case of constant total power.

BRIEF DESCRIPTION OF DRAWINGS

The accompanying drawings described herein are used to provide a further understanding of the present disclosure and form a part of the present application. The illustrative embodiments and descriptions thereof in the present disclosure are used to explain the present disclosure and not to limit the present disclosure in an improper way. In the accompanying drawings:

FIG. 3 is a flowchart of a method for transmitting downlink data according to embodiments of the present disclosure;

FIG. 4 is a schematic diagram of a radio frame structure of a TDD air coverage system according to embodiments of the present disclosure;

FIG. 5 is a schematic diagram of time-domain and frequency-domain mapping positions of a downlink cell-level control channel and a demodulation reference signal of the downlink cell-level control channel in a TDD air coverage system according to embodiments of the present disclosure;

FIG. 10 is a structure diagram of a radio frame of an FDD super far coverage system according to embodiments of the present disclosure;

FIG. 11 is a schematic diagram of a radio-frame-level time-domain-resource mapping of a cell downlink broadcast channel with PCI=0 according to embodiments of the present disclosure;

FIG. 12 is a schematic diagram of a radio-frame-level time-domain-resource mapping of a cell downlink broadcast channel with PCI=4 according to embodiments of the present disclosure;

DETAILED DESCRIPTION

The present disclosure will be detailed below with reference to the accompanying drawings in conjunction with the embodiments. If not in collision, the embodiments described herein and the features thereof can be combined with each other.

It is to be noted that the terms "first", "second" and the like in the description, claims and drawings of the present disclosure are used to distinguish between similar objects and are not necessarily used to describe a particular order or sequence.

To solve the preceding problem in the related art, a wireless communication system in which the WI-FI system uses the same radio frequency band resources is provided in embodiments of the present disclosure. The wireless communication system allows for a cell coverage radius exceeding 100 km on the premise of using small transmitted power so that the wireless communication system can work normally and this frequency band and other systems do not interact each other. The present disclosure will be described below in conjunction with embodiments.

Figures 1, 2:
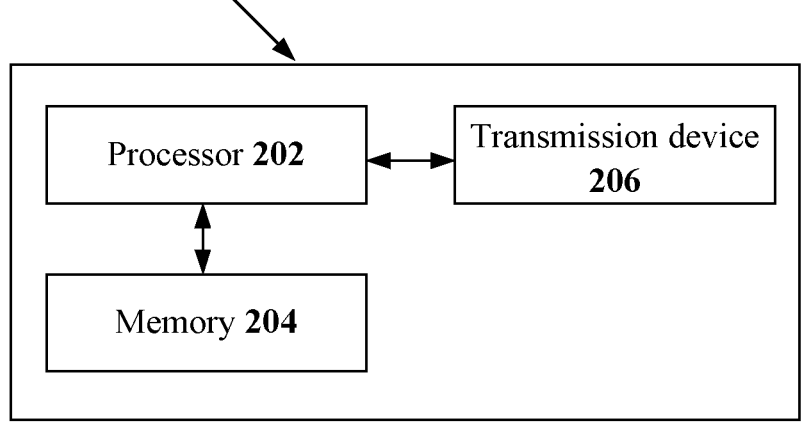
FIG. 1 is a flowchart of a method for transmitting downlink data according to embodiments of the present disclosure.
FIG. 2 is a block diagram illustrating a hardware structure of a mobile terminal for performing a method for receiving downlink data according to embodiments of the present disclosure.

A method for transmitting downlink data is provided in this embodiment. FIG. 1 is a flowchart of a method for transmitting downlink data according to embodiments of the present disclosure. As shown in FIG. 1, the method includes the steps described below.

In step S102, the downlink data is transmitted by using at least one of a cell-level common channel in a downlink channel or a downlink user-level channel in the downlink channel. The cell-level common channel and the downlink user-level channel occupy different time-domain positions.

The preceding operation may be performed by a base station. In this embodiment, the downlink data transmitted by the base station may be divided into the cell-level common channel and the downlink user-level channel. The cell-level common channel may be defined as such that data transmitted by the base station belong to all users (corresponding to user equipment, referred to as users) of the cell, and all users of the cell can receive and demodulate the data transmitted by the base station. The cell-level common channel may include, but is not limited to, a downlink broadcast channel, a downlink synchronization signal, and a corresponding cell-level reference signal, etc. The downlink user-level channel may be defined as such that the transmitted data belongs only to a certain terminal user (for example, the preceding target user equipment). The downlink user-level channel may include a downlink user-level service channel, a control channel, and a downlink user-level reference signal. Moreover, in this embodiment, to satisfy the requirement for ultra-long cell coverage, it is feasible to adopt the time-division manner for the preceding two channels. That is, in one time-resource unit (slot/time-domain symbol), only one of the two channels exists. Since only one of the two channels exists in one time resource unit, it is not needed to allocate the total transmitted power on the two channels in the case where the total transmitted power is limited. In this way, one channel can occupy all the total transmitted power in this time resource unit so that the transmitted power of the data transmitted by a single channel is improved. That is, the coverage of the wireless signal transmitted by a single channel is improved, so that the coverage distance is increased and long-distance coverage and wide-range wireless coverage are achieved.

In the preceding embodiment, the downlink data is transmitted by using the cell-level common channel and the downlink user-level channel in a time division manner. Compared with the related art in which data is transmitted by using a cell-level common channel and a downlink user-level channel at the same time-domain position, the solution provided in the present disclosure can effectively improve the power, thereby achieving the purpose of allowing for a longer coverage distance, solving the problem in which the requirement for longer-distance coverage cannot be satisfied in the case of limited transmitted power in the related art, and achieving the effect of increasing the transmitted power of the broadcast channel and implementing longer-distance coverage by allocating power in the case of constant total power.

In one embodiment, transmitting the downlink data by using the cell-level common channel includes transmitting the downlink data at a dedicated time-domain position and a dedicated frequency-domain position by using the cell-level common channel. A bandwidth corresponding to the dedicated frequency-domain position is less than a total system downlink bandwidth. No data is transmitted on a bandwidth other than the bandwidth corresponding to the dedicated frequency-domain position. The rated transmitted power corresponding to the total system downlink bandwidth is allocated on the cell-level common channel. In this embodiment, when the downlink data is transmitted by using the cell-level common channel, the downlink data can be configured to be transmitted in fixed time-domain and frequency-domain positions. No other channel data will be transmitted in the time domain of the downlink data while the downlink data is transmitted. All transmitted power data is occupied. The rated transmitted power corresponding to the total system downlink bandwidth is allocated on the cell-level common channel so that the transmitted power can be improved. Here, the bandwidth occupied by the dedicated frequency-domain position may be referred to as a first bandwidth. The first bandwidth is less than the total system bandwidth. The total system bandwidth here is the sum of the available bandwidths allocated to the communication system. The total system bandwidth includes the first bandwidth and a second bandwidth. The second bandwidth may be a bandwidth other than the first bandwidth. In this embodiment, the second bandwidth may not be used for transmitting data, and thus, the rated transmitted power of the total system bandwidth can be all used for data transmission on the first bandwidth. That is, the rated transmitted power available to the second bandwidth is used for increasing the transmitted power of the first bandwidth. In this way, the transmitted power of the first bandwidth is improved. The first bandwidth is the bandwidth occupied by the cell-level common channel. That is, the transmitted power of the cell-level common channel is improved. In this way, the coverage of the cell is improved.

In one embodiment, in a case of a single carrier, the dedicated frequency-domain position is determined in a fixed manner or in a time-domain alternate-transmission manner within the single carrier, or in a case of multiple carriers, the dedicated frequency-domain position is determined in a fixed manner or in a time-domain alternate-transmission manner among the multiple carriers. In this embodiment, the dedicated frequency-domain position (also referred to as a fixed frequency domain) is supported by time-domain alternate-transmission between carriers or within a single carrier.

In some embodiments, in the case of a single carrier, one carrier may be divided into multiple sub-bands. The dedicated frequency-domain position is determined in the time-domain alternate-transmission manner: data is transmitted alternately by using multiple sub-bands in the time domain. The sub-band here may be one or more subcarriers or may be divided in other manners. In the case of multiple carriers, data is transmitted on different carriers at different time-domain positions in the time-domain alternate-transmission manner.

In one embodiment, transmitting the downlink data by using the cell-level common channel includes transmitting the downlink data in a transmission manner of a broadcast beam by using the cell-level common channel. In this embodiment, the broadcast beam refers to broadcast-direction beamforming covering all receiving positions within the cell.

In one embodiment, before transmitting the downlink data in the transmission manner of the broadcast beam by using the cell-level common channel, the method further includes performing beamforming on the broadcast beam at a baseband side. In this embodiment, beamforming may also be performed at the radio frequency side or at the baseband side and the radio frequency side. In the embodiments described below where beamforming is performed at the radio frequency side, beamforming may also be performed at the radio frequency side or at the baseband side and the radio frequency side. This description will not be repeated below.

Transmitting, by using the cell-level common channel, the downlink data in the transmission manner of the beamformed broadcast beam includes: transmitting, by using the cell-level common channel, the downlink data in the transmission manner of the beamformed broadcast beam.

In one embodiment, the time-domain interval between the time-domain position of the cell-level common channel and the time-domain position of a demodulation reference signal corresponding to the cell-level common channel is less than a predetermined threshold.

The cell-level common channel and the demodulation reference signal corresponding to the cell-level common channel are mapped according to a fixed mapping rule and are mapped onto different time-domain positions. In this embodiment, it is feasible to reduce the time-domain interval between the time-domain position of the cell-level downlink broadcast channel and the time-domain position of a demodulation reference signal corresponding to the cell-level downlink broadcast channel as much as possible (that is, the time-domain interval between the time-domain position of the cell-level common channel and the time-domain position of the demodulation reference signal corresponding to the cell-level common channel is less than the predetermined threshold) to ensure better demodulation performance. In this embodiment, the cell-level downlink broadcast channel and the demodulation reference signal corresponding to the cell-level downlink broadcast channel are mapped according to a fixed mapping rule and are mapped onto different time-domain positions to resist possible interference at fixed positions.

In one embodiment, transmitting the downlink data by using the downlink user-level channel includes transmitting, by using the downlink user-level channel, the downlink data in a transmission manner of the first narrow beam. In this embodiment, when the downlink data is transmitted by using the downlink user-level channel, a narrow beam (that is, the preceding first narrow beam) is always used for transmission. The narrow beam refers to a directional beam having a beamforming effect and pointing to the user from the base station. Compared with the broadcast beam, the narrow beam has beamforming gains because the narrow beam has a beamforming effect.

The narrow beam may include a user-level beam that typically does not cover the entire cell. The narrow beam is relative to a wide beam. The wide beam may include a broadcast beam that covers the entire cell.

In one embodiment, before transmitting, by using the downlink user-level channel, the downlink data in the transmission manner of the first narrow beam, the method further includes performing beamforming on the first narrow beam at a baseband side.

In one embodiment, performing beamforming on the first narrow beam at the baseband side includes performing beamforming on the first narrow beam at the baseband side according to frequency-domain beamforming.

In one embodiment, performing beamforming on the first narrow beam at the baseband side includes determining beamforming information of a target user equipment; and performing beamforming on the first narrow beam at the baseband side according to the beamforming information of the target user equipment.

In one embodiment, the beamforming information of the target user equipment is determined in at least one of the following manners: (1) The direction-of-arrival (DOA) angle is determined according to the position of a base station and the position of the target user equipment, and the beamforming weight value of the target user equipment is determined according to the DOA angle. The base station is configured to determine the cell-level common channel in the downlink channel and the downlink user-level channel in the downlink channel and to transmit the downlink data by using the cell-level common channel and the downlink user-level channel in a time division manner. (2) The weight value of the target user equipment is determined according to the received uplink data transmitted by the target user equipment or the demodulation reference signal corresponding to the received uplink data. (3) The beamforming weight value of the target user equipment reported by the target user equipment is received. The beamforming weight value is determined by the target user equipment according to the received downlink data or the demodulation reference signal corresponding to the received downlink data. It is to be noted that the preceding manners for determining the beamforming information of the target user equipment are only preferred manners. In practical use, other manners may be used for determining the beamforming information.

In one embodiment, transmitting the downlink data by using the downlink user-level channel includes determining, according to at least one of an interference level or a scheduling strategy where a target user equipment receives the downlink data, a time-domain position and a frequency-domain position at which the downlink data is transmitted by using the downlink user-level channel; and transmitting, by using the downlink user-level channel, the downlink data at the determined time-domain position and the determined frequency-domain position.

In one embodiment, transmitting the downlink data by using at least one of the cell-level common channel in the downlink channel or the downlink user-level channel in the downlink channel includes transmitting the downlink data by using at least one of the cell-level common channel in the downlink channel or the downlink user-level channel in the downlink channel in the case where the transmitted power is improved. In this embodiment, the power allocated to the base station is less than the total system power, and when transmission is performed on the broadcast channel, unallocated power is not occupied; therefore, during actual data transmission, it is feasible to improve the transmitted power of the base station to achieve the purpose of making full use of power resources.

In one embodiment, transmitting the downlink data by using the cell-level common channel includes adjusting, according to a predetermined rule at a predetermined time, a time-domain position and a frequency-domain position at which the downlink data is transmitted by using the cell-level common channel; and transmitting, by using the cell-level common channel, the downlink data at the adjusted time-domain position and the adjusted frequency-domain position. This embodiment mainly relates to downlink cell-level channel and data at the base station side. Since the time-domain and frequency-domain positions at which the base station transmits data are fixed, the time-domain and frequency-domain positions at which the base station transmits data are adjusted according to rules at different time so that fixed interference is avoided. In this embodiment, the interference that may be caused by other communication systems in the ISM band can be effectively prevented from resulting in degradation or deterioration of the designed wireless communication system. For the control channel and the service channel that are improved based on power, interference is avoided and system performance is improved as much as possible by using the manners described below.

In some embodiments, in order for system performance to be improved, the downlink data may be transmitted by using the downlink user-level channel in the following manner: measuring signal-to-interference-plus-noise ratio levels on other resources except time-domain and frequency-domain resources occupied by the cell-level common channel; and transmitting, by using the downlink user-level channel, the downlink data at a resource position where a signal-to-interference-plus-noise ratio level is the maximum among the signal-to-interference-plus-noise ratio levels on the other resources.

The method embodiments of the present disclosure may be implemented on a mobile terminal, a computer terminal, or a similar computing device. Using running on a mobile terminal as an example, FIG. 2 is a block diagram illustrating a hardware structure of a mobile terminal for performing a method for receiving downlink data according to embodiments of the present disclosure. As shown in FIG. 2, a mobile terminal 20 may include one or more (only one is shown in FIG. 2) processors 202 (the processor 202 may include, but is not limited to, a processing device such as a microprocessor MCU or a programmable logic device FPGA), a memory 204 for storing data, and a transmission device 206 for communication functions. It is to be understood by those skilled in the art that the structure shown in FIG. 2 is merely illustrative and not intended to limit the structure of the preceding electronic device. For example, the mobile terminal 20 may also include more or fewer components than those shown in FIG. 2, or have a different configuration than that shown in FIG. 2.

The memory 204 may be configured to store software programs and modules of application software, such as program instructions/modules corresponding to the method for receiving downlink data in embodiments of the present disclosure. The processor 202 executes the software programs and modules stored in the memory 204 to implement various functional applications and data processing, that is, implement the preceding method. The memory 204 may include a high-speed random access memory, and may also include a non-volatile memory such as one or more magnetic storage devices, flash memories, or other non-volatile solid state memories. In some examples, the memory 204 may include memories that are disposed remote from the processor 202. These remote memories can be connected to the terminal 20 via a network. Examples of the preceding network include, but are not limited to, the Internet, an intranet, a local area network, a mobile communication network and a combination thereof.

The transmission device 206 is configured to receive or transmit data via a network. Examples of the preceding network may include a wireless network provided by a communication provider of the mobile terminal 20. In one example, the transmission device 206 includes a Network Interface Controller (NIC) that can be connected to other network devices through a base station to communicate with the Internet. In one example, the transmission device 206 may be a Radio Frequency (RF) module for communicating with the Internet wirelessly.

A method for transmitting downlink data is provided in this embodiment. FIG. 3 is a flowchart of a method for transmitting downlink data according to embodiments of the present disclosure. As shown in FIG. 3, the method includes the steps described below.

In step S302, the downlink data transmitted by a base station by using at least one of a cell-level common channel in a downlink channel or a downlink user-level channel in the downlink channel is received. A time-domain position at which the downlink data transmitted by the base station and by using the cell-level common channel is received is different from a time-domain position at which the downlink data transmitted by the base station and by using the downlink user-level channel is received.

The preceding operation may be performed by a user equipment (for example, the preceding target user equipment).

In the preceding embodiment, the base station can transmit the downlink data by using the cell-level common channel and the downlink user-level channel in a time division manner. Compared with the related art in which data is transmitted by using a cell-level common channel and a downlink user-level channel at the same time-domain position, the solution provided in the present disclosure can effectively improve the power, thereby achieving the purpose of allowing for a longer coverage distance, solving the problem in which the requirement for longer-distance coverage cannot be satisfied in the case of limited transmitted power in the related art, and achieving the effect of increasing the transmitted power and implementing longer-distance coverage.

In one embodiment, receiving the downlink data transmitted by the base station and by using at least one of the cell-level common channel in the downlink channel or the downlink user-level channel in the downlink channel includes receiving, through a third narrow beam, the downlink data transmitted by the base station and by using at least one of the cell-level common channel in the downlink channel or the downlink user-level channel in the downlink channel. In this embodiment, the user equipment may always adopt a narrow beam (for example, the preceding third narrow beam) to receive data. This narrow beam refers to the antenna beamforming direction of the user equipment pointing to the base station.

In one embodiment, at least two third narrow beams are provided, and when a target user equipment for receiving the downlink data by using the third narrow beams moves to a cell edge, at least one third narrow beam is configured to continue pointing to a source serving cell of the target user equipment and at least another one third narrow beam is configured to point to a neighboring cell of the source serving cell. In this embodiment, to ensure that the communication system allows for mobility processes such as cell measurement and cell handover, a terminal (that is, the user equipment) needs to allow for at least two beam directions at the same time. The two beam directions may be generated by two antennas at the same time or may be generated by one antenna at the same time. Within the cell, the two beam directions of the terminal (that is, the user equipment) point to the base station simultaneously. The terminal may improve the received SINR of the downlink data in the manner of combined reception. When the terminal moves to the cell edge, one beam continues pointing to the serving cell (that is, the preceding source serving cell) and the other beam sequentially points to neighboring cells related to the serving cell. Through the beam pointing to the neighboring cell, the terminal receives the cell common reference signal of the neighboring cell and measures data like the received level and/or the received SINR to prepare to trigger the cell handover and the like.

In this embodiment, the cell edge may be a logical concept. If the difference between the received power of the local cell and the received power of the neighboring cell is less than a specific threshold, then it is determined that the user equipment moves to the edge of the cell and the user equipment is a cell-edge device. If the difference between the received power of the local cell and the received power of the neighboring cell is greater than a specific threshold, then it is determined that the user equipment is in the center of the cell and the user equipment is a cell-center device. The current cell here may be the current serving cell of the user equipment.

In one embodiment, when more than two neighboring cells are provided and the number of the at least another one third narrow beam is less than the number of the neighboring cells, the direction of part or all of the at least another one third narrow beam is changed such that the at least another one third narrow beam points to the neighboring cells of the source serving cell. In this embodiment, when the third narrow beams used for pointing to the neighboring cells are in one-to-one correspondence with the neighboring cells, if some narrow beams need to point to more than two neighboring cells, the directions of these narrow beams need to be changed. Of course, if the third narrow beams are in one-to-one correspondence with the neighboring cells, the directions of the narrow beams do not need to be changed.

In one embodiment, whether the target user equipment moves to the cell edge is determined in the following manner: whether the target user equipment moves to the cell edge is determined according to at least one of a received power level or a received signal-to-interference-plus-noise ratio (SINR) level of received downlink data transmitted by a source serving base station.

In one embodiment, before receiving, through the third narrow beam, the downlink data transmitted by the base station and by using at least one of the cell-level common channel in the downlink channel or the downlink user-level channel in the downlink channel, the method further includes performing beamforming on the third narrow beam at a baseband side.

In one embodiment, performing beamforming on the third narrow beam at the baseband side includes determining beamforming information of a target user equipment for receiving the downlink data by using the third narrow beam; and performing beamforming on the third narrow beam at the baseband side according to the beamforming information of the target user equipment.

In one embodiment, the method further includes transmitting uplink data to the base station by using a fourth narrow beam. In this embodiment, the user equipment always transmit an uplink data channel, an uplink control channel, and a corresponding uplink reference signal by using narrow beams.

In one embodiment, before transmitting the uplink data to the base station by using the fourth narrow beam, the method further includes performing beamforming on the fourth narrow beam at a baseband side.

In one embodiment, performing beamforming on the fourth narrow beam at the baseband side includes determining beamforming information of a target user equipment for transmitting the uplink data to the base station by using the fourth narrow beam; and performing beamforming on the fourth narrow beam at the baseband side according to the beamforming information of the target user equipment.

In one embodiment, transmitting the uplink data to the base station by using the fourth narrow beam includes measuring signal-to-interference-plus-noise ratio levels on other resources except time-domain and frequency-domain resources occupied by the cell-level common channel; and transmitting, by using the fourth narrow beam, the uplink data at a resource position where a signal-to-interference-plus-noise ratio level is the maximum among the signal-to-interference-plus-noise ratio levels on the other resources.

In one embodiment, the beamforming information of the target user equipment is determined in at least one of the following manners: (1) The direction-of-arrival (DOA) angle is determined according to the position of a base station and the position of the target user equipment, and the beamforming weight value of the target user equipment is determined according to the DOA angle. (2) A fixed set of beamforming weight values are traversed and the beamforming weight value having the maximum downlink received SINR is selected from the fixed set of beamforming weight values. (3) The beamforming weight value is determined according to the received uplink data or the demodulation reference signal corresponding to the received uplink data. (4) The beamforming weight value from the base station is received. The beamforming weight value is determined by the base station according to the received downlink data or the demodulation reference signal corresponding to the received downlink data.

The 3GPP-based standard Time Division Duplexing (TDD) Long-Term Evolution (LTE) air coverage wireless communication system is modified so that the type of the terminal is an airborne terminal installed on the aircraft and working in the frequency band of 2.412 GHz to 2.432 GHz subject to WI-FI system interference. The wireless communication system obtained according to this method and allowing for ultra-long coverage is as described below.

The solution provided in this embodiment may be as described below.

In step 1, referring to FIG. 4, the radio frame structure of the designed TDD radio communication system is 20 ms, where the guard interval is 2 ms, a cell coverage radius of 300 km is allowed, and the number of uplink subframes is 5, each uplink subframe occupies 1 ms, the number of downlink subframes is 13, and each downlink subframe occupies 1 ms. The definitions of Resource Block (RB), Orthogonal Frequency Division Multiplexing (OFDM) and the like are consistent with those in the 3GPP LTE protocol.

In step 2, the downlink common control channel included in the LTE protocol includes a Physical Broadcast Channel (PBCH), a Primary Synchronization Signal (PSS), a Secondary Synchronization Signal (SSS) and the corresponding demodulation reference signal Cell Reference Signal (CRS). According to the method described in embodiments of the present disclosure, these data is modified in the manner of exclusively occupying the transmission time-domain position and increasing the transmitted power. The obtained symbol structure is as shown in FIG. 5.

The first seven symbols of the subframe are used to carry downlink cell-level control channel data and the demodulation reference signal of the downlink cell-level control channel, and the last seven symbols are used to carry downlink user-level channel data and the demodulation reference signal of the downlink user-level channel data. The subframe is marked as a C subframe and is mapped onto the 18th subframe as shown in FIG. 4.

The first symbol Sym #1 is used to carry the cell-level data demodulation reference signal CRS. Sym #1 contains a total of 1200 subcarriers but carries only 100 CRSs (one per RB). Other RE positions are configured to be unavailable. This design allows all transmitted power to be used for data transmission of CRS RE. Compared with the LTE protocol according to which the maximum transmitted power is evenly allocated to all subcarriers, the transmitted power of CRS can be increased by 10*log 10(1200/100)=10.8 dB.

The second symbol to the fifth symbol Sym #2 to #5 are used to carry the downlink broadcast channel PBCH, occupying six RBs (RB47 to RB52). Other RE positions are configured to be unavailable. At this time, the transmitted power of PBCH RE can be increased by 10*log 10(100/6) =12.2 dB.

The sixth symbol and the seventh symbol Sym #6 and #7 are used to carry PSS and SSS respectively, occupying six RBs (RB47 to RB52). Other RE positions are configured to be unavailable. At this time, the transmitted power of PSS/SSS can be increased by 10*log 10(100/6)=12.2 dB.

Figure 6:
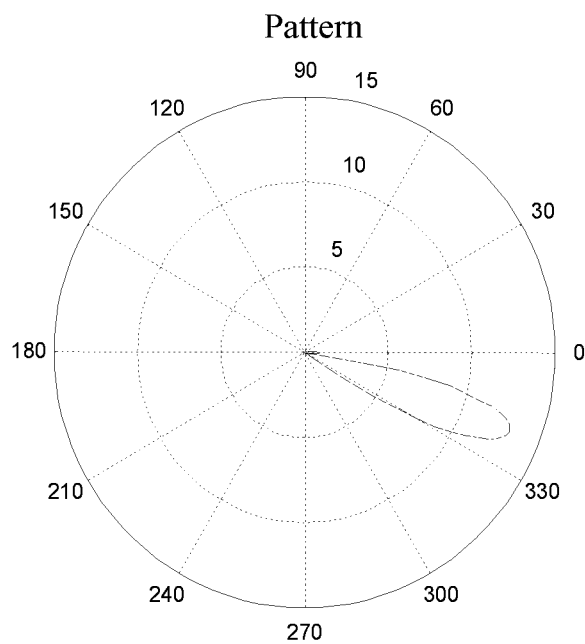
FIG. 6 is a service beamforming pattern according to embodiments of the present disclosure.

This system adopts single-station three-cell networking, so the horizontal angle range covered by each cell is 120 degrees. The broadcast beam pattern adopted by this system is shown in FIG. 6.

In some embodiments, in order for possible interference from other systems to be avoided, in the C subframe of each radio frame, any six RBs onto which the preceding PBCH/PSS/SSS map may be selected from a bandwidth corresponding to 100 RBs according to the remainder of the radio frame number modulo 16.

In step 3, the uplink data transmitted by the terminal includes Physical Uplink Control Channel (PUCCH), Physical Uplink Shared Channel (PUSCH), Sounding Reference Signal (SRS) and Demodulation Reference Signal (DMRS). The mapping manner of the uplink data is consistent with the LTE protocol. However, the uplink data needs to be transmitted based on a baseband airspace narrow beam. The specific obtaining manner is to calculate the DOA angle according to the Global Position System (GPS) of the base station and the GPS of the terminal. The GPS information of the ground base station is stored in the ROM of the airborne terminal. The airborne terminal acquires the GPS information of the base station according to the Physical Cell Identifier (PCI) of the access cell, calculates the radio wave direction according to the GPS information of the access cell, and then performs beamforming according to this direction.

In some embodiments, it is allowed to calculate the SINR level per RB in the uplink and to select appropriate RBs through the base station scheduler according to this SINR level so as to transmit the uplink data at the selected RB positions.

Assuming that an airborne terminal in the system is located at horizontal 350 degrees at a certain time and in a single-station three-cell network, then the horizontal angle range covered by each cell is 120 degrees and the adopted broadcast beam pattern is as shown in FIG. 6.

In step 4, user-level downlink data transmitted by the base station includes Enhanced Physical Downlink Control Channel (EPDCCH), PDSCH, DMRS, and so on. The mapping manner of the downlink data is consistent with the LTE protocol. However, the downlink data needs to be transmitted based on a baseband airspace narrow beam. The specific obtaining manner is to calculate the DOA angle according to the GPS of the base station and the GPS of the terminal. The airborne terminal periodically reports its GPS information through the dedicated air interface signaling. The base station calculates the direction of the radio wave according to its own GPS information and performs beamforming according to this direction.

Figure 7:
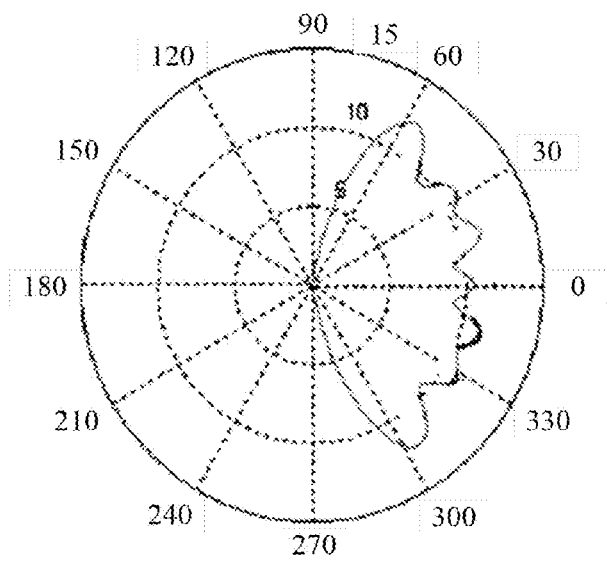
FIG. 7 is a broadcast beamforming pattern according to embodiments of the present disclosure.

Assuming that a terminal in the system is located at horizontal 340 degrees at a certain time, then the user-level narrow beam pattern used after the GPS information of the terminal is calculated is as shown in FIGS. 6 and 7.

In some embodiments, it is allowed by the terminal to calculate the SINR level per RB in the downlink according to DMRS/CRS, to notify the calculated SINR level to the base station in the manner like sub-band QCI feedback, and to select appropriate RBs through the base station scheduler so as to transmit the downlink data.

Figure 8:
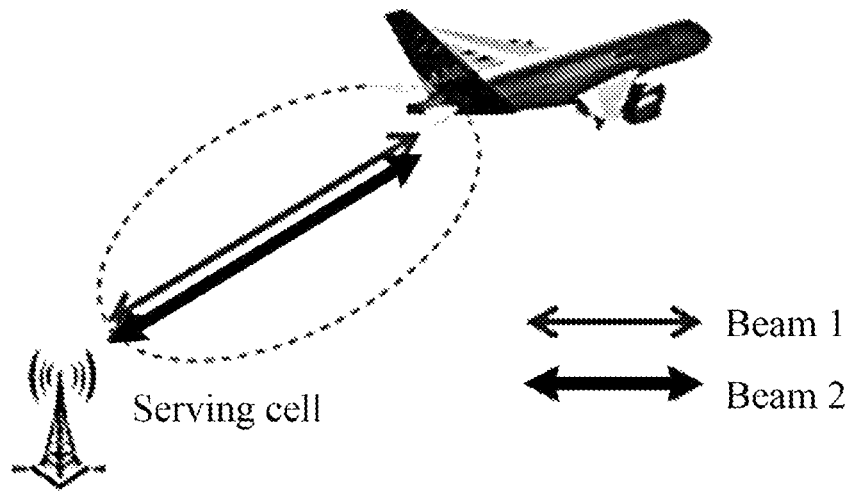
FIG. 8 is a schematic diagram illustrating directions which two independent beams at the terminal side point to in the case where an airborne terminal is within a cell according to embodiments of the present disclosure.

In the system provided in the preceding embodiment, in order to support mobility, the terminal installed on the aircraft is required to allow for two narrow beams at the same time. As shown in FIG. 8, the direction to which the beam points may be based on the principles described below.

In an access cell, when the downlink received power level RSRP of the serving cell received by the terminal is greater than or equal to −90 dBm, the terminal is considered to be inside the cell. In this case, both narrow beams point to the serving cell, and the terminal may use beam 1 for uplink transmission and beam 2 for downlink reception. In this case, the downlink receiving terminal uses the two beams simultaneously to receive data, and the downlink received data of the two beams may be demodulated in the manner of combination based on the maximum SINR so that the downlink performance of the system is optimized.

Figure 9:
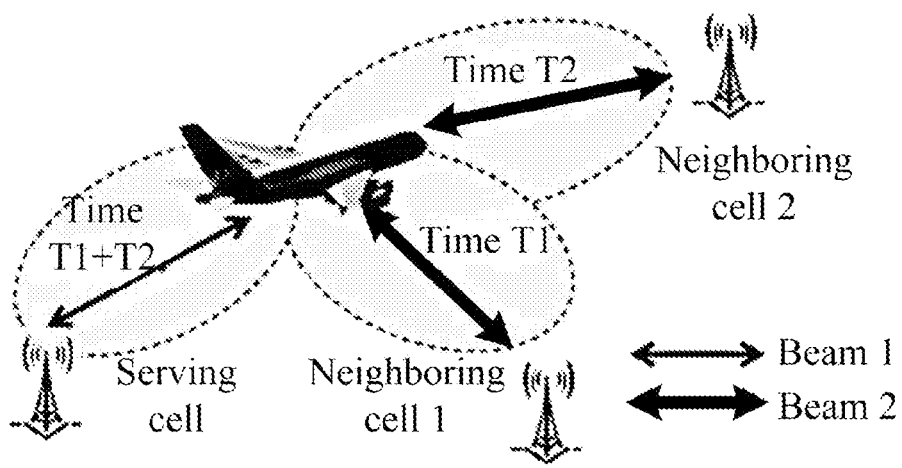
FIG. 9 is a schematic diagram illustrating directions which two independent beams at the terminal side point to in the case where an airborne terminal is at a cell edge according to embodiments of the present disclosure.

When the downlink received power level RSRP of the serving cell received by the terminal is less than −90 dBm, it is considered that the terminal has left the internal area of the cell, and cell handover may be performed. In this case, the terminal still uses beam 1 to point to the serving cell and perform uplink transmission and downlink reception. At the same time, beam 2 sequentially points to the neighboring cells of the serving cell according to the neighboring cell data, and beam 2 is used to receive the downlink received power levels of the neighboring cells. Assuming that the serving cell includes two neighboring cells, the downlink received power levels of the two neighboring cells are sequentially measured. Based on embodiment one, it can be known that within one radio frame 20 ms, a downlink cell reference signal CRS will be transmitted, so the minimum period of the sequential measurement of the neighboring cells is 20 ms. During the odd-numbered radio frame (time T1), beam 2 points to neighboring cell 1 and performs measurement. During the even-numbered radio frame (time T2), beam 2 points to neighboring cell 2 and performs measurement. During time T1+T2, beam 1 always points to the serving cell. For details, see FIG. 9.

In this embodiment, the FDD LTE mode is adopted. The allocation proportion of uplink and downlink subframes in this embodiment is as shown in FIG. 10. In this embodiment, multi-carrier aggregation (CA) is allowed, and there are five carriers in total. Compared with embodiment one, the transmitted power is unchanged. Therefore, to ensure cell coverage, it is needed to adopt the time-domain alternate-transmission manner for sub-frame data on the cell broadcast channel of each carrier to ensure that the total transmitted power of the channel remains unchanged.

The alternate-transmission manner may be as shown in FIGS. 11 and 12. It can be seen from FIGS. 11 and 12 that in each radio sub-frame, one and only one carrier is used to transmit a downlink broadcast waveform cell-level channel, each carrier is used to transmit twice, and the remaining carriers are used to transmit in turn according to a fixed rule. The carrier alternate-transmission formula is as follows:

$$freq_i = \left(PCI\mathrm{mod}5 + \left[\frac{SFN}{2}\right]\right)\mathrm{mod}5 + 1$$

where $freq_i=i$, $i=[1,5]$, and i denotes carrier 1 to 5.

In some embodiments, to avoid interference that occurs when data is transmitted on downlink broadcast channels of adjacent cells on the same carrier at the same time, transmitted carriers based on Physical Cell Identifier (PCI) of different cells are transmitted alternately in the time domain. For details, see the preceding formula. FIG. 11 shows the carrier transmission position of the downlink broadcast channel of the cell having PCI=0. FIG. 12 shows the carrier transmission position of the downlink broadcast channel of the cell having PCI=4.

From the description of the preceding embodiments, it will be apparent to those skilled in the art that the method according to any preceding embodiment may be implemented by use of software plus a necessary general-purpose hardware platform, or may, of course, be implemented by hardware, but in many cases, the former is a preferred implementation. Based on this understanding, the solution provided in the present disclosure substantially, or the part contributing to the existing art, may be embodied in the form of a software product. The software product is stored in a storage medium (such as a ROM/RAM, a magnetic disk or an optical disk) and includes several instructions for enabling a terminal (which may be a mobile phone, a computer, a server or a network device) to perform the method according to each embodiment of the present disclosure.

An apparatus for transmitting downlink data and an apparatus for receiving downlink data are provided in this embodiment. The apparatuses are used for implementing the preceding embodiments and optional embodiments. What has been described will not be repeated. As used below, the term "module" may be software, hardware or a combination thereof capable of implementing preset functions. The apparatuses in the embodiments described below are preferably implemented by software, but implementation by hardware or by a combination of software and hardware is also possible and conceived.

Figure 13:
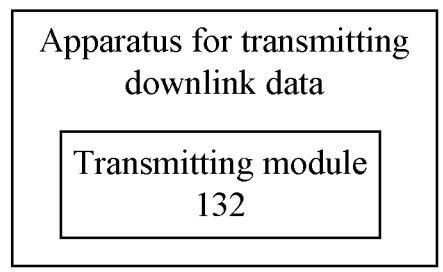
FIG. 13 is a block diagram illustrating a structure of an apparatus for transmitting downlink data according to embodiments of the present disclosure.

FIG. 13 is a block diagram illustrating a structure of an apparatus for transmitting downlink data according to embodiments of the present disclosure. As shown in FIG. 13, the apparatus includes a transmitting module 132. The apparatus is described below.

The transmitting module 132 is configured to transmit the downlink data by using at least one of a cell-level common channel in a downlink channel or a downlink user-level channel in the downlink channel. The cell-level common channel and the downlink user-level channel occupy different time-domain positions.

In one embodiment, when transmitting the downlink data by using the cell-level common channel, the transmitting module 132 includes a transmitting unit, which is configured to transmit the downlink data at a dedicated time-domain position and a dedicated frequency-domain position by using the cell-level common channel. A bandwidth corresponding to the dedicated frequency-domain position is less than a total system downlink bandwidth. No data is transmitted on a bandwidth other than the bandwidth corresponding to the dedicated frequency-domain position.

In one embodiment, in a case of the single carrier, the dedicated frequency-domain position is determined in a time-domain alternate-transmission manner within the single carrier, or in a case of multiple carriers, the dedicated frequency-domain position is determined in a time-domain alternate-transmission manner among the multiple carriers.

In one embodiment, the transmitting module 132 may transmit the downlink data by using the cell-level common channel in the following manner: transmitting the downlink data in a transmission manner of a beamformed broadcast beam by using the cell-level common channel.

In one embodiment, before transmitting the downlink data in the transmission manner of the beamformed broadcast beam by using the cell-level common channel, the apparatus for transmitting downlink data is further configured to perform beamforming on the broadcast beam at a baseband side.

In one embodiment, when transmitting the downlink data by using the cell-level common channel, the transmitting module 132 may be configured to transmit the downlink data at a dedicated time-domain position and a dedicated frequency-domain position by using the cell-level common channel.

In one embodiment, the time-domain interval between the time-domain position of the cell-level common channel and the time-domain position of a demodulation reference signal corresponding to the cell-level common channel is less than a predetermined threshold. In another embodiment, the cell-level common channel and the demodulation reference signal corresponding to the cell-level common channel are mapped according to a fixed mapping rule and are mapped onto different time-domain positions.

In one embodiment, when transmitting the downlink data by using the downlink user-level channel, the transmitting module 132 may be configured to transmit the downlink data in a transmission manner of a first narrow beam by using the downlink user-level channel.

In one embodiment, the apparatus for transmitting downlink data is further configured to perform beamforming on the first narrow beam at a baseband side before transmitting the downlink data in the transmission manner of the first narrow beam by using the downlink user-level channel.

In one embodiment, the apparatus for transmitting downlink data is further configured to perform beamforming on the first narrow beam at the baseband side according to frequency-domain beamforming.

In one embodiment, the apparatus for transmitting downlink data is configured to determine beamforming information of a target user equipment; and perform beamforming on the first narrow beam at the baseband side according to the beamforming information of the target user equipment.

In one embodiment, the beamforming information of the target user equipment is determined in at least one of the following manners: (1) The direction-of-arrival (DOA) angle is determined according to the position of a base station and the position of the target user equipment, and the beamforming weight value of the target user equipment is determined according to the DOA angle. The base station is configured to determine the cell-level common channel in the downlink channel and the downlink user-level channel in the downlink channel and to transmit the downlink data by using the cell-level common channel and the downlink user-level channel in a time division manner. (2) The weight value of the target user equipment is determined according to the received uplink data transmitted by the target user equipment or the demodulation reference signal corresponding to the received uplink data. (3) The beamforming weight value of the target user equipment reported by the target user equipment is received. The beamforming weight value is determined by the target user equipment according to the received downlink data or the demodulation reference signal corresponding to the received downlink data. It is to be noted that the preceding manners for determining the beamforming information of the target user equipment are only preferred manners. In practical use, other manners may be used for determining the beamforming information.

In one embodiment, when transmitting the downlink data by using the downlink user-level channel, the transmitting module 132 is configured to determine, according to at least one of an interference level or a scheduling strategy where a target user equipment receives the downlink data, a time-domain position and a frequency-domain position at which the downlink data is transmitted by using the downlink user-level channel; and transmit the downlink data at the determined time-domain position and frequency-domain position by using the downlink user-level channel.

In one embodiment, the transmitting module 132 is configured to transmit the downlink data by using at least one of the cell-level common channel in the downlink channel or the downlink user-level channel in the downlink channel in the case where the transmitted power is improved.

In one embodiment, when transmitting the downlink data by using the cell-level common channel, the transmitting module 132 is configured to adjust, according to a predetermined rule at a predetermined time, a time-domain position and a frequency-domain position at which the downlink data is transmitted by using the cell-level common channel; and transmit the downlink data at the adjusted time-domain position and the adjusted frequency-domain position by using the cell-level common channel.

In one embodiment, when transmitting the downlink data by using the downlink user-level channel, the transmitting module 132 is configured to measure signal-to-interference-plus-noise ratio levels on other resources except time-domain and frequency-domain resources occupied by the cell-level common channel; and transmit the downlink data at a resource position where a signal-to-interference-plus-noise ratio level is the maximum among the signal-to-interference-plus-noise ratio levels on the other resources by using the downlink user-level channel.

Figure 14:
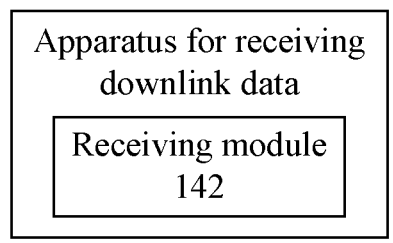
FIG. 14 is a block diagram illustrating a structure of an apparatus for receiving downlink data according to embodiments of the present disclosure.

FIG. 14 is a block diagram illustrating a structure of an apparatus for receiving downlink data according to embodiments of the present disclosure. As shown in FIG. 14, the apparatus includes a receiving module 142. The apparatus is described below.

The receiving module 142 is configured to receive the downlink data transmitted by a base station by using at least one of a cell-level common channel in a downlink channel or a downlink user-level channel in the downlink channel. A time-domain position at which the downlink data transmitted by the base station and by using the cell-level common channel is received is different from a time-domain position at which the downlink data transmitted by the base station and by using the downlink user-level channel is received.

In one embodiment, the receiving module 142 includes a receiving unit, which is configured to receive, through a third narrow beam, the downlink data transmitted by the base station and by using at least one of the cell-level common channel in the downlink channel or the downlink user-level channel in the downlink channel.

In one embodiment, at least two third narrow beams are provided, and when a target user equipment for receiving the downlink data by using the third narrow beams moves to a cell edge, at least one third narrow beam is configured to continue pointing to a source serving cell of the target user equipment and at least another one third narrow beam is configured to point to a neighboring cell of the source serving cell. In this embodiment, to ensure that the communication system allows for mobility processes such as cell measurement and cell handover, a terminal (that is, the user equipment) needs to allow for at least two beam directions at the same time. The two beam directions may be generated by two antennas at the same time or may be generated by one antenna at the same time. Within the cell, the two beam directions of the terminal (that is, the user equipment) point to the base station simultaneously. The terminal may improve the received SINR of the downlink data in the manner of combined reception. When the terminal moves to the cell edge, one beam continues pointing to the serving cell (that is, the preceding source serving cell) and the other beam sequentially points to neighboring cells related to the serving cell. Through the beam pointing to the neighboring cell, the terminal receives the cell common reference signal of the neighboring cell and measures data like the received level and/or the received SINR to prepare to trigger the cell handover and the like.

In one embodiment, when more than two neighboring cells are provided and the number of the at least another one third narrow beam is less than the number of the neighboring cells, the direction of part or all of the at least another one third narrow beam is changed such that the at least another one third narrow beam points to the neighboring cells of the source serving cell.

In one embodiment, the apparatus for receiving downlink data is further configured to determine whether the target user equipment moves to the cell edge according to at least one of a received power level or a received signal-to-interference-plus-noise ratio (SINR) level of received downlink data transmitted by a source serving base station.

In one embodiment, the apparatus for receiving downlink data is further configured to perform beamforming on the third narrow beam at a baseband side before receiving, through the third narrow beam, the downlink data transmitted by the base station by using at least one of the cell-level common channel in the downlink channel or the downlink user-level channel in the downlink channel.

In one embodiment, the apparatus for receiving downlink data is configured to perform beamforming on the third narrow beam at the baseband side by determining beamforming information of a target user equipment for receiving the downlink data by using the third narrow beam; and perform beamforming on the third narrow beam at the baseband side according to the beamforming information of the target user equipment.

In one embodiment, the apparatus for receiving downlink data is further configured to transmit uplink data to the base station by using a fourth narrow beam.

In one embodiment, the apparatus for receiving downlink data is further configured to perform beamforming on the fourth narrow beam at a baseband side before transmitting the uplink data to the base station by using the fourth narrow beam.

In one embodiment, the apparatus for receiving downlink data is configured to perform beamforming on the fourth narrow beam at the baseband side by determining beamforming information of a target user equipment for transmitting the uplink data to the base station by using the fourth narrow beam; and perform beamforming on the fourth narrow beam at the baseband side according to the beamforming information of the target user equipment.

In one embodiment, the apparatus for receiving downlink data is further configured to transmit the uplink data to the base station by using the fourth narrow beam by measuring signal-to-interference-plus-noise ratio levels on other resources except time-domain and frequency-domain resources occupied by the cell-level common channel; and transmitting the uplink data at a resource position where a signal-to-interference-plus-noise ratio level is the maximum among the signal-to-interference-plus-noise ratio levels on the other resources by using the fourth narrow beam.

In one embodiment, the beamforming information of the target user equipment is determined in at least one of the following manners: (1) The direction-of-arrival (DOA) angle is determined according to the position of a base station and the position of the target user equipment, and the beamforming weight value of the target user equipment is determined according to the DOA angle. (2) A fixed set of beamforming weight values are traversed and the beamforming weight value having the maximum downlink received SINR is selected from the fixed set of beamforming weight values. (3) The beamforming weight value is determined according to the received uplink data or the demodulation reference signal corresponding to the received uplink data. (4) The beamforming weight value from the base station is received. The beamforming weight value is determined by the base station according to the received downlink data or the demodulation reference signal corresponding to the received downlink data.

In one embodiment, a wireless communication system is provided. The wireless communication system includes a base station and a terminal. The base station can be configured to perform any preceding method for transmitting downlink data, and the terminal can be configured to perform any preceding method for receiving downlink data.

It is to be noted that the various modules described above may be implemented by software or hardware. Implementation by hardware may, but may not necessarily, be performed by the following method: the various modules described above are located in a same processor; or, in any combination, the various modules are located in different processors.

A storage medium is provided in embodiments of the present disclosure. The storage medium includes stored programs. When executed, the programs cause any preceding method to be performed.

In some embodiments, the storage medium may include, but is not limited to, a U disk, a read-only memory (ROM), a random access memory (RAM), a mobile hard disk, a magnetic disk, an optical disk or another medium capable of storing program codes. The storage medium may be a non-transitory storage medium.

A communication device is provided in embodiments of the present disclosure. The communication device may include a memory and a processor. The processor is connected to the memory and configured to execute programs stored in the memory. When executed, the programs cause any preceding method to be performed.

Through the solution provided in embodiments of the present disclosure, a wireless communication system allowing for ultra-long coverage can be built within the ISM band, and the transmission manners of uplink and downlink dedicated and common data and control channels are redesigned so that ultra-long-distance coverage is achieved on the principle of low transmitted power.

In particular, a wireless communication system allowing for ultra-long coverage is provided. The transmission manners of uplink and downlink dedicated and common data and control channels are redesigned so that ultra-long-distance coverage is achieved on the principle of low transmitted power.

Apparently, those skilled in the art should know that each preceding module or step of the present disclosure may be implemented by a universal computing device, they may be concentrated on a single computing device or distributed in a network formed by multiple computing devices, and in some embodiments, they may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation. Therefore, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the principle of the present disclosure are within the scope of the present disclosure.

What is claimed is:

1. A method for transmitting downlink data, comprising:
transmitting the downlink data via at least one of a cell-level common channel in a downlink channel or a downlink user-level channel in the downlink channel, wherein the cell-level common channel and the downlink user-level channel occupy different time-domain positions;
wherein transmitting the downlink data via the downlink user-level channel comprises:
measuring signal-to-interference-plus-noise ratio levels on other resources except time-domain and frequency-domain resources occupied by the cell-level common channel; and
transmitting, via the downlink user-level channel, the downlink data at a resource position where a signal-to-interference-plus-noise ratio level is a maximum among the signal-to-interference-plus-noise ratio levels on the other resources.

2. The method of claim 1, wherein transmitting the downlink data by using the cell-level common channel comprises:
transmitting the downlink data at a dedicated time-domain position and a dedicated frequency-domain position via the cell-level common channel, wherein a bandwidth corresponding to the dedicated frequency-domain position is less than a total system downlink bandwidth, no data is transmitted on a bandwidth other than the bandwidth corresponding to the dedicated frequency-domain position, and a rated transmitted power corresponding to the total system downlink bandwidth is allocated on the cell-level common channel.

3. The method of claim 2, wherein
in a case of a single carrier, the dedicated frequency-domain position is determined in a fixed manner or in a time-domain alternate-transmission manner within the single carrier; or
in a case of multiple carriers, the dedicated frequency-domain position is determined in a fixed manner or in a time-domain alternate-transmission manner among the multiple carriers.

4. The method of claim 1, wherein transmitting the downlink data by using the cell-level common channel comprises:
performing beamforming on a broadcast beam at a baseband side; and
transmitting, via the cell-level common channel, the downlink data in a transmission manner of the beamformed broadcast beam.

5. The method of claim 1 wherein at least one of following cases applies:
a time-domain interval between a time-domain position of the cell-level common channel and a time-domain position of a demodulation reference signal corresponding to the cell-level common channel is less than a predetermined threshold; or
the cell-level common channel and the demodulation reference signal corresponding to the cell-level common channel are mapped according to a fixed mapping rule and are mapped onto different time-domain positions.

6. The method of claim 1, wherein transmitting the downlink data via the downlink user-level channel comprises:
performing beamforming on a first narrow beam at a baseband side; and
transmitting, via the downlink user-level channel, the downlink data in a transmission manner of the beamformed first narrow beam;
wherein performing beamforming on the first narrow beam at the baseband side comprises at least one of:
performing beamforming on the first narrow beam at the baseband side according to frequency-domain beamforming; or
determining beamforming information of a target user equipment; and performing beamforming on the first narrow beam at the baseband side according to the beamforming information of the target user equipment.

7. The method of claim 1, wherein transmitting the downlink data via the downlink user-level channel comprises:
determining, according to at least one of an interference level or a scheduling strategy where a target user equipment receives the downlink data, a time-domain position and a frequency-domain position at which the downlink data is transmitted via the downlink user-level channel; and
transmitting, via the downlink user-level channel, the downlink data at the determined time-domain position and the determined frequency-domain position.

8. The method of claim 1, wherein transmitting the downlink data via the cell-level common channel comprises:
adjusting, according to a predetermined rule at a predetermined time, a time-domain position and a frequency-domain position at which the downlink data is transmitted via the cell-level common channel; and
transmitting, via the cell-level common channel, the downlink data at the adjusted time-domain position and the adjusted frequency-domain position.

9. A non-transitory storage medium comprising stored programs, wherein when executed, the programs cause the method of claim 1 to be performed.

10. A method for receiving downlink data, comprising:
receiving the downlink data from a base station via at least one of a cell-level common channel in a downlink channel or a downlink user-level channel in the downlink channel at a resource position where a signal-to-interference-plus-noise ratio level is a maximum among signal-to-interference-plus-noise ratio levels on other resources except time-domain and frequency-domain resources occupied by the cell-level common channel,
wherein a time-domain position at which the downlink data is received from by the base station via the cell-level common channel is different from a time-domain position at which the downlink data is received from the base station via the downlink user-level channel.

11. The method of claim 10, wherein receiving the downlink data from the base station via at least one of the cell-level common channel in the downlink channel or the downlink user-level channel in the downlink channel comprises:
receiving, through a third narrow beam, the downlink data from the base station via at least one of the cell-level common channel in the downlink channel or the downlink user-level channel in the downlink channel.

12. The method of claim 11, wherein at least two third narrow beams are provided, and in response to determining that a target user equipment for receiving the downlink data through the at least two third narrow beams moves to a cell edge, at least one of the at least two third narrow beams is configured to continue pointing to a source serving cell of the target user equipment and at least another one of the at least two third narrow beams is configured to point to a neighboring cell of the source serving cell.

13. The method of claim 12, wherein in a case where more than two neighboring cells are provided and a number of the at least another one of the at least two third narrow beams is less than a number of the more than two neighboring cells, a direction of part or all of the at least another one of the at least two third narrow beams is changed such that the at least another one of the at least two third narrow beams points to the more than two neighboring cells of the source serving cell.

14. The method of claim 12, wherein the method further comprises determining whether the target user equipment moves to the cell edge by:
determining whether the target user equipment moves to the cell edge according to at least one of a received power level or a received signal-to-interference-plus-noise ratio (SINR) level of received downlink data transmitted by a source serving base station.

15. The method of claim 11, wherein before receiving, through the third narrow beam, the downlink data from the base station via at least one of the cell-level common channel in the downlink channel or the downlink user-level channel in the downlink channel, the method further comprises:
performing beamforming on the third narrow beam at a baseband side;
wherein performing beamforming on the third narrow beam at the baseband side comprises:
determining beamforming information of a target user equipment for receiving the downlink data through the third narrow beam; and
performing beamforming on the third narrow beam at the baseband side according to the beamforming information of the target user equipment.

16. The method of claim 10, further comprising:
transmitting uplink data to the base station through a fourth narrow beam;
wherein transmitting the uplink data to the base station through the fourth narrow beam comprises:
measuring signal-to-interference-plus-noise ratio levels on other resources except time-domain and frequency-domain resources occupied by the cell-level common channel; and
transmitting, through the fourth narrow beam, the uplink data at a resource position where a signal-to-interference-plus-noise ratio level is a maximum among the signal-to-interference-plus-noise ratio levels on the other resources.

17. The method of claim 16, wherein before transmitting the uplink data to the base station by using the fourth narrow beam, the method further comprises:
performing beamforming on the fourth narrow beam at a baseband side;
wherein performing beamforming on the fourth narrow beam at the baseband side comprises:
determining beamforming information of a target user equipment for transmitting the uplink data to the base station by using the fourth narrow beam; and
performing beamforming on the fourth narrow beam at the baseband side according to the beamforming information of the target user equipment.

18. An apparatus for receiving downlink data, comprising a memory, and a processor connected to the memory and configured to execute programs stored in the memory, wherein when executed, the programs cause the method of claim 10 to be performed.

19. An apparatus for transmitting downlink data, comprising a memory, and a processor connected to the memory and configured to execute programs stored in the memory, wherein when executed, the programs cause the processor to perform steps in following modules:
a transmitting module, which is configured to transmit the downlink data via at least one of a cell-level common channel in a downlink channel or a downlink user-level channel in the downlink channel, wherein the cell-level common channel and the downlink user-level channel occupy different time-domain positions;

wherein the transmitting module transmits the downlink data via the downlink user-level channel by;

measuring signal-to-interference-plus-noise ratio levels on other resources except time-domain and frequency-domain resources occupied by the cell-level common channel; and transmitting, via the downlink user-level channel, the downlink data at a resource position where a signal-to-interference-plus-noise ratio level is a maximum among the signal-to-interference-plus-noise ratio levels on the other resources.

* * * * *